June 13, 1967
R. KLEEB
3,324,510
ARRANGEMENT FOR THE PRODUCTION OF
GRANULES FROM PLASTIC MATERIAL
Filed Sept. 19, 1963
2 Sheets-Sheet 1
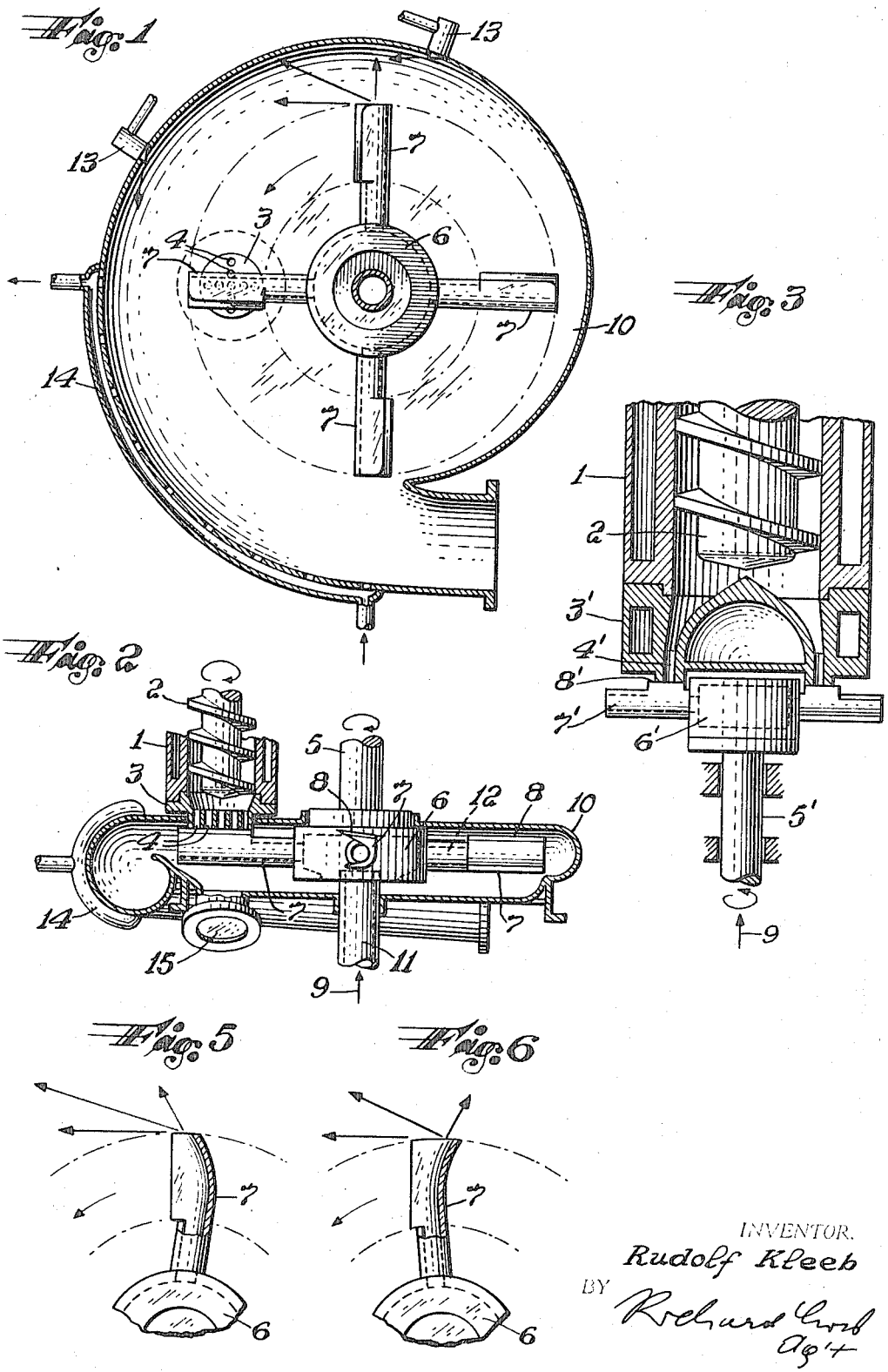
INVENTOR.
Rudolf Kleeb

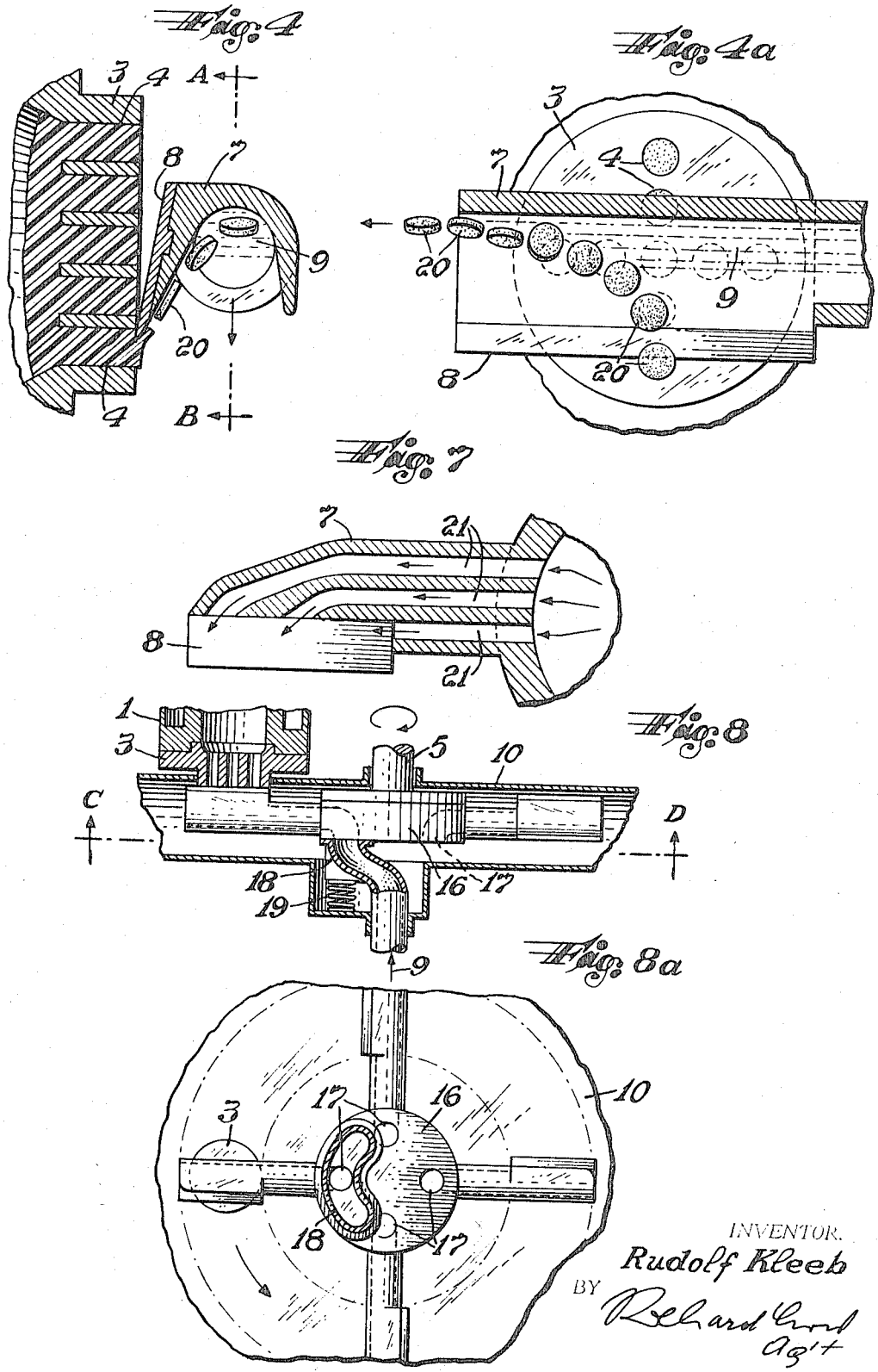

United States Patent Office 3,324,510
Patented June 13, 1967

3,324,510
ARRANGEMENT FOR THE PRODUCTION OF GRANULES FROM PLASTIC MATERIAL
Rudolf Kleeb, Gempenstrasse 52, Pratteln, Switzerland
Filed Sept. 19, 1963, Ser. No. 310,051
Claims priority, application Germany, Sept. 27, 1962, B 68.997
4 Claims. (Cl. 18—12)

This invention relates to an arrangement for the production of granules from plastic material.

In the production of granules from plastic material, especially synthetic plastics, with a suitable arrangement, for example an extruder, lengths of the plastic material are forced out of a nozzle, and are cut into granules immediately after leaving the nozzle. The difficulty often appears here that the still warm, soft particles stick together, which disturbs their conveying away and their further working. For this reason it has already been proposed to house the nozzle with the cutting device in a box-like housing, which has at least partially heatable or coolable walls. Thus the particles are prevented from sticking on the walls. Rather they are caught up in a suitable gaseous or liquid, cooled or heated, medium. In this medium the separation of the particles from one another takes place, the particles being hardened and consolidated at least on their surface, the medium ensures the further conveying of the particles out of the reception housing. However, in many cases these measures are not sufficient and sticking together of the particles cannot be avoided.

The purpose of the invention is the avoidance of the above-mentioned drawbacks. The process for the production of granules from plastic material is characterised in that lengths of plastic material are forced out of a nozzle or nozzles, cut into pieces, and thrown tangentially outwards. The arrangement for carrying out the process comprises essentially extruding means and cutting means, whereby the cutting means is mounted to rotate before an apertured discharge die and is formed to hold the cut material or granules, to expose the granules to developing centrifugal forces, and to thrust the granules tangentially in outward directions.

The invention will be further explained hereinafter with refernece to embodiments of the invention represented in the accompanying drawings, wherein:

FIGURE 1 shows an arrangement of the invention in front elevation,

FIGURE 2 shows a horizontal section through an extruder with nozzle and cutting device as parts of said arrangement, FIGURE 3 shows a modification of a detail of FIGURE 2, FIGURE 4 shows a vertical section through a nozzle plate with knife and knife-holder, FIGURE 4a shows a section along the line A–B in FIGURE 4, FIGURE 5 shows a knife-holder curved in the direction of rotation, FIGURE 6 shows a modified knife-holder curved contrarily of the direction of rotation, FIGURE 7 shows a detail of a knife-holder or knife arm, FIGURE 8 shows a variant, and FIGURE 8a shows a section along the line C–D in FIGURE 8.

In the drawings, as may be seen from FIGURES 1 and 2, the arrangement possesses a housing 1 in which there is arranged a worm 2. The housing 1 is provided with a nozzle 3 which has bores 4. The number and shape of the bores can be selected according to requirements. For particular purposes it is also possible to arrange only a single bore. Perpendicularly of the plane of the nozzle plate there is arranged a knife shaft 5 which is driven in a manner not represented through a stepless rotation-speed-governing device. One end of the knife shaft 5 carries a cylindrical housing which encloses a chamber 6 and supports knife arms 7 arranged in cross form. The said knife arms 7 are equipped with knives 8. Here it should be mentioned that the knife shaft 5 is adjustable in axial direction. Furthermore, the knives 8 can be adjusted on the knife arms 7 in relation to the nozzle 3.

As may be seen from FIGURE 4, the knife arms 7 are made hollow, so that an open channel is produced in which there is conducted, for instance, a gaseous cooling or heating medium 9. In this channel the cut-off granules or particles 20 are received and conducted radially outwards together wtih the medium at high speed by the centrifugal action. In the medium 9 the particles 20 are caught and kept separate from one another and conducted outwards into a reception housing 10. The latter is made of spiral form similarly to the housing of a centrifugal pump. Thus the medium serves to convey the cut particles which at the same time are cooled or heated by the medium.

In the embodiment as described so far the worm 2 is arranged outside the knife shaft 5. In FIGURE 3 there is shown a variant wherein the knife shaft 5' is arranged in the nozzle axis. In this case the knife shaft 5' is supported on the side remote from the worm 2. This embodiment is very space-saving but suitable only for relatively low cutting speeds.

The knife arms 7 which extend radially, as shown in FIGURE 1, can be curved at their outer ends in the direction of rotation or contrarily of the direction of rotation, as may be seen from FIGURES 5 and 6.

The supply of the medium 9 takes place axially of the knife shaft 5 through a tube 11 into the chamber 6. From this chamber it passes through bores 12 into the channels of the knife arms 7. As may be seen from FIGURE 7, a plurality of bores 21 are provided, which lead to the knife 8. For the same purpose there are provided nozzles 13 (FIGURE 1), through which a cooling or heating medium or additional air is conducted into the reception housing 10 and into the cooling jacket 14 of the reception housing. The cutting operation can be observed through a viewing window 15 (FIGURE 2).

The embodiment shown in FIGURES 1 and 2 produces a uniform distribution of the medium to all knives, irrespective of whether they are just cutting or are away from the nozzle 3. It is, however, possible to direct the supply of the medium to the cutting zone. In this case the tube 11 is arranged in offset fashion in relation to the axis of the chamber 6 and the chamber 6 is divided into as many sectors as there are knife arms.

A similar but more effective arrangement is represented in FIGURES 8 and 8a. In place of the chamber 6 there is present a solid cylinder 16 which has a passage 17 for each knife arm. A hollow sliding piece 18 of kidney-shaped profile is pressed by a spring 19 against the front wall of the cylinder 16, through which sliding piece the medium 9 is supplied under pressure if necessary. In this manner the medium is conducted directly to the desired point, the flow energy deriving from the centrifugal action being increased by the pressure of the medium.

What I claim is:

1. Arrangement for the production of granules from plastic material, comprising extruding means having an apertured discharge die, said extruding means extruding plastic material through the apertures of said die, and rotary cutting means cutting extruded material issuing from said die into granules, said cutting means being constituted by knife arms having a channellike cross section and thus being formed with cavities serving to receive granules as they are cut, said knife arms being adapted to centrifugally throw said granules in tangential outward directions.

2. The arrangement according to claim 1, characterised in that the outer ends of the knife arms are curved in or contrarily of the direction of rotation.

3. In the arrangement according to claim 1, means for supplying a fluid medium to the channels of said knife arms in the direction toward the outer ends of said knife arms.

4. In the arrangement according to claim 1, a centrally located distribution member for said medium, said means for supplying said medium including as many separate passages through said member as are channels, said passages leading to said channels, and a sliding sleeve adapted to provide communication between a source of said medium and one of said passages and thus one of said channels.

References Cited

UNITED STATES PATENTS

| | | | |
|---|---|---|---|
| 2,497,212 | 2/1950 | Donofrio | 18—21 |
| 2,524,751 | 10/1950 | Berger | 18—12 |
| 2,902,718 | 9/1959 | Martelli et al. | 18—21 |
| 2,918,701 | 12/1959 | Hull et al. | 264—142 |
| 3,025,564 | 3/1962 | Voigt | 264—142 |
| 3,143,766 | 8/1964 | Rohn | 18—12 |

ROBERT F. WHITE, *Primary Examiner.*

F. S. WHISENHUNT, S. I. LANDSMAN,
*Assistant Examiners.*